United States Patent [19]

Homs

[11] 4,055,141
[45] Oct. 25, 1977

[54] TRANSPARENT DIAL AND OUTER TRANSPARENT COVER FOR SCALE WITH ZERO-SETTING ADJUSTMENT

[76] Inventor: Douglas M. Homs, 1538 Industrial Way, Hillsborough, Calif. 94002

[21] Appl. No.: 662,147

[22] Filed: Feb. 27, 1976

[51] Int. Cl.² .............................................. G01D 7/00
[52] U.S. Cl. .................................. 116/129 F; 73/431; 116/114 R
[58] Field of Search ........... 116/129 F, 129 R, 114 R; 73/431; 82/34 R, 45

[56] References Cited

U.S. PATENT DOCUMENTS

| | | | |
|---|---|---|---|
| 2,620,412 | 12/1952 | Ford | 73/431 |
| 3,413,952 | 12/1968 | Homs | 73/431 |
| 3,889,840 | 6/1975 | Price | 73/431 |

Primary Examiner—S. Clement Swisher
Assistant Examiner—Denis E. Corr

Attorney, Agent, or Firm—Julian Caplan

[57] ABSTRACT

For dial scales, scale graduations are displayed on a transparent dial which fits in front of the pointer. The dial has a flange which fits over the circular flange of the metal pan behind the dial. The transparent dial may be removed and interchanged and twisted relative to the pointer for zero-adjustment or tare adjustment. The dial may have various types of graduations. In one modification the pan is blank and all graduations are on the twistable transparent dial. In another modification the pan dial is marked in normal fashion; the transparent dial has one or several "under-over" markings which can be aligned with the pan marking for the desired average weight. To adjust the metal pan so that it is centered relative to the pointer staff, a template is used which fits accurately relative to the flange of the pan. A plug in the center of the template receives the staff. The screws which fasten the pan to its mounting bracket may be tightened through openings in the template.

7 Claims, 7 Drawing Figures

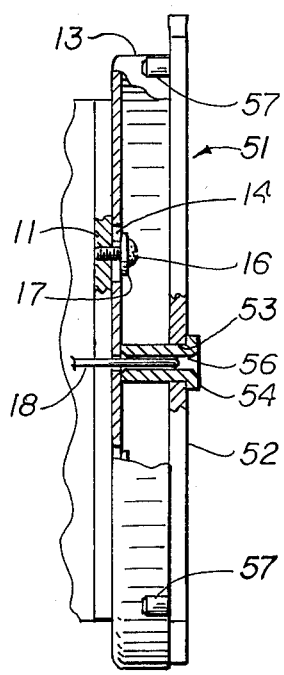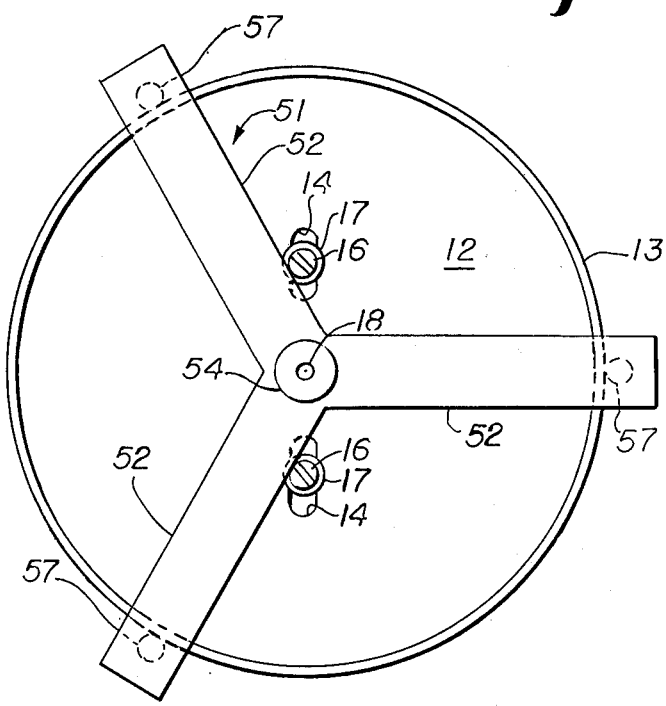

TRANSPARENT DIAL AND OUTER TRANSPARENT COVER FOR SCALE WITH ZERO-SETTING ADJUSTMENT

This invention relates to a new and improved removable and replaceable transparent cover for a scale having a dial carrying graduations and which may be rotated for zero and tare setting adjustments and for "under-over" indications.

A principal feature of one form of the invention is that the scale graduations are displayed on a transparent dial rotatable with the chart in front of the scale pointer rather than being displayed on a dial on a pan conventionally fixed to the scale behind the scale pointer. This construction makes it possible to remove and replace and turn the dial in either direction for setting the scale pointer at zero or for tare adjustment. The dial has a flange which fits over the circular pan flange so that the cover may be turned on the pan flange. The setting for zero and tare adjustment is easily and accurately accomplished.

A principal feature of the invention is that since the scale graduations are displayed on a removable, transparent dial they may be readily interchanged. It will be understood that dial scales are used for many different purposes, depending upon the markings on the dial, although the scale mechanism itself is universal. By making the dial removable and interchangeable and rotatable, the same scale may be used for a variety of purposes. Among these applications are scales which show weight by simple graduations in a circular pattern, scales which show weights in different units of measurement by concentric markings, scales which show postage rates for different classes and zones, over-under scales used in check weighing and batch weighing and a variety of special purpose dials, all of which may be used in accordance with the present invention.

Another feature of the invention is the reduction in parallax between the pointer and the scale markings inasmuch as the pointer is located in closer proximity to the graduations.

Still another feature of the invention is the provision of means for improving the accuracy of the scale by insuring that the transparent dial cover and the metal pan which holds the transparent cover are all accurately centered relative to the center of the staff on which the scale pointer is mounted. Since the pan is easily adjustable in position relative to the bracket which holds it, the template enables the pan to be adjusted so that it is precisely centered relative to the pointer staff.

Other objects of the present invention will become apparent upon reading the following specification and referring to the accompanying drawings in which similar characters of reference represent corresponding parts in each of the several views.

In the drawings:

FIG. 3 is a vertical midsection through the structure of FIGS. 1 or 2.

FIG. 4 is a vertical midsectional view of a cover removed from the scale pan.

FIG. 5 is an enlarged fragmentary sectional view of a portion of the structure of FIG. 3 taken substantially along line 5—5 of FIG. 3.

FIG. 6 is an elevational view showing use of a template to center the metal pan on a scale.

FIG. 7 is a vertical sectional view through the structure of FIG. 6.

Figure 1:
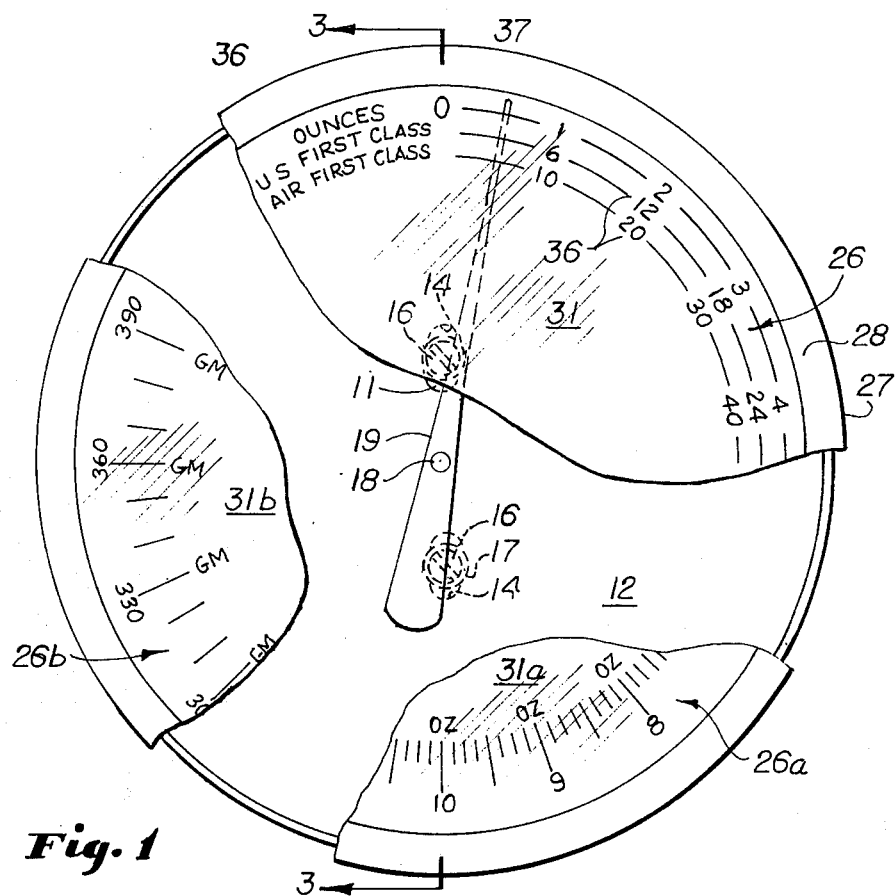
FIG. 1 is an elevational view of the structure of one form of the present invention with the cover partially broken away to reveal the pan inside the cover and showing at different areas of the dial different types of markings which are illustrative of the different varieties of scales which are accommodated by the present invention.

In the form of the invention shown in FIG. 1 and 3, the scale mechanism has a frame bracket 11 here shown as vertical but which may be tilted depending upon the design of the manufacturer. A circular pan 12 having a peripheral outwardly turned flange 13 is fastened to bracket 11; and in accordance with the present invention, the pan 12 is movable relative to bracket 11 and is then fixed in position by means of screws 16 which fit through enlarged holes 14 in pan 12. Preferably, washers 17 are interposed between the heads of the screws 16 and the pan 12 to further assist in locating the pan permanently in position once the screws 16 are tightened. It is desirable that the pan 12 and particularly its circular flange 13 be accurately centered relative to the staff 18 which projects out through a hole in the center of pan 12. Means for accurately locating the pan 12 is hereinafter described in detail. Scale pointer 19 is connected to staff 18 through a hub 21 which fits on to the outer end of staff 18. In most scale structures, the pointer 19 is read in connection with graduations which are permanently displayed on the pan 12. However, in accordance with one form of the present invention, the pan 12 is blank, preferably being painted white and the pointer 19 is at considerable distance in front of pan 12. Parallax, one of the common problems in reading dial scales, is largely eliminated by the present invention because the scale markings are displayed on one of several transparent dials 31, 31a, 31b and preferably on the back surface of said dial, so that the distance between the markings and the pointer 19 is minimized.

The pan 12 is closed off by a transparent cover 26, 26a, 26b, having a downturned peripheral flange 27 which fits immediately outside flange 13 or, alternatively, fits immediately inside flange 13. Annular rim 28 is inwardly turned relative to flange 27 and is formed on the front with a rabbet providing a shoulder 29. Fitting against shoulder 29 is a circular dial 31 which is cemented or otherwise fixed so that the flange 27 and dial 31 turn together. Different types of dials 31, 31a, 31b, 31c, etc., may be used. One of the features of the present invention is the fact that the cover 27 may be slipped off the pan 12 by pulling it outwardly. The cover 26 may also be twisted about the pan 12 since the flanges 13 and 27 are circular and friction lugs 32 are formed on the inside of flange 27 (or the outside of flange 13) to frictionally engage the flanges 13, 27, to reduce likelihood of unintentional twisting or removal.

The dial 31 may carry a wide variety of different scale graduations. Fragments of said graduations are shown in FIG. 1. Thus at the top of FIG. 1 the dial 31 is shown with postal class and zone markings as well as ounces so that the scale may be used to compute U.S. postage. The zero 37 is adjusted so that when there is nothing on the pan of the scale and the pointer 19 is at a position of rest, the cover 26 may be twisted so that the pointer 19 is in line with the zero 37 of the scale. Also shown in the right-hand lower corner of FIG. 1 is a conventional circular weight marking such as ounces, or other standard units of measure. On the lower side of FIG. 1 metric markings may be applied. It will be understood that only three of a wide variety of scale markings are here illustrated, and merely by interchanging the dial 31 the function of the scale may be changed. All that needs to be done to change the dial is to remove the cover 26 and to replace it with one having a different disk 31, the rim 28 being uniform.

Figure 2:
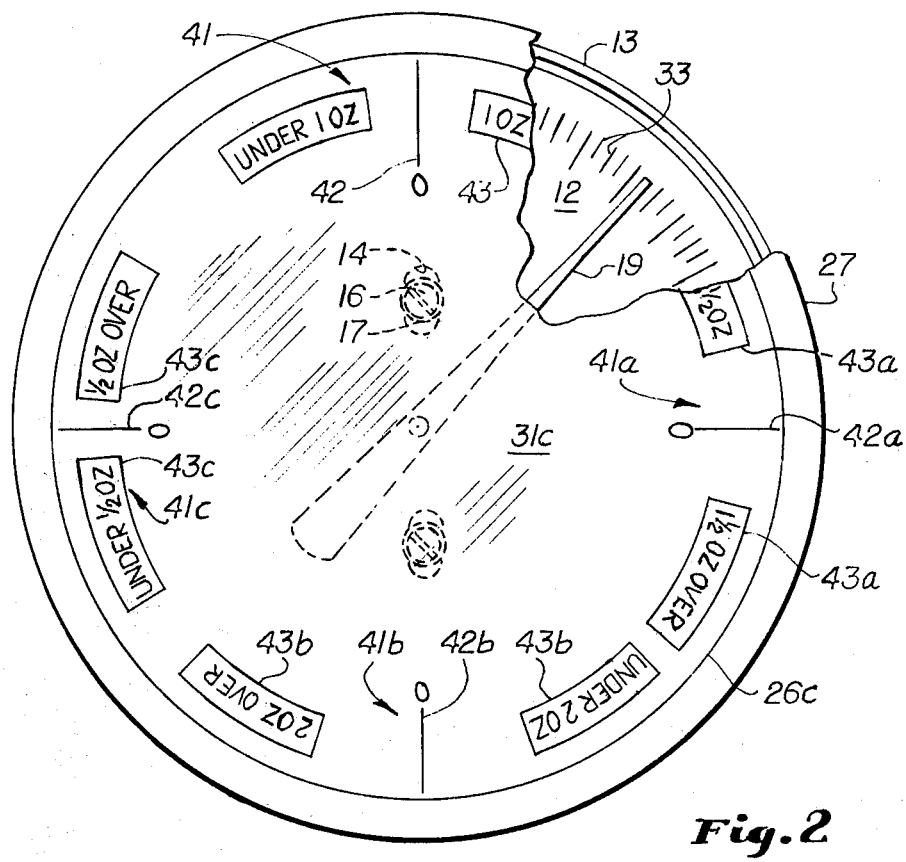
FIG. 2 is a view similar to FIG. 1 showing a variety of under-over markings used with conventional weight markings on the pan.

FIG. 2 shows another modification of the invention. In this form of the invention, the transparent cover 26c is used where pan 12 carries one of a variety of weight graduations 33 behind the cover 26c. These are here shown as ounces. Zero or tare is adjusted in conventional manner. Transparent disk 31c has several different under-over markings 41, 41a – 41c. Thus at the top of disk 31c is a center line 42 and to either side are arcuate bars 43 marked on the left "Under 1 oz." and on the right "1 oz. over." The distance between line 42 and the nearest edges of bars 43 equals 1 oz. of the graduations 33. Markings 41a are similar except that the gaps between the inner edges of bars 43a are 1½ times that of bars 43. To set the dial for 1 oz. under-over 16 ozs., cover 26c is twisted so that line 42 is aligned with the "16 oz." (e.g.) graduation 33 of pan 12. Material is added to the scale pan (not shown) of the scale until pointer 19 is anywhere between bars 43 and the weight of material is thus within 1 oz. under or over the desired weight. If cover 26c is twisted so that marking 42a is aligned with the 16 oz. (e.g.) graduation 33, when pointer 19 is anywhere between the inner edges of bars 43a, the material is under or over 1½ oz. of desired weight. Bars 43b are for 2 oz. under-over and bars 43c for ½ oz. under-over. The choice of markings is subject to wide discretion.

Any of the covers 26, 26a, 26b, 26c may be interchanged.

It is very important that the pan 12 and the flange 13 be accurately centered relative to the center of pointer staff 18 in order for the structure to be accurate. Frequently, the pan 12 is attached to the bracket 11 through oversized holes 14 in pan 12 through which fit screws 16 with the resultant play in holes 14. By loosening the screws 16 and adjusting the position of the pan relative to the bracket 11 and then retightening screws 16 the pan may be brought back into center. As shown in FIGS. 6 and 7, a jig 51 may be used to facilitate the adjustment operation. Jig 51 has three radially extending arms 52 and at the outer ends thereof are pins 57 which are equidistant from the middle of jig 51 and are tangent to the outside (or, alternatively the inside) of flange 13. In the middle of the jig 51 is a hole 53. Since different scales have different staff sizes 18, a plug 54 fits into the hole 53 and has a reduced diameter portion 56 which accurately slips over the staff 18. Different plugs 54 are used for different staffs 18. By removing plug 54 and replacing it with one of different center hole size, different staffs 18 may be accommodated.

Preliminary to adjustment of pan 12, screws 16 are loosened. Thereupon, the jig 51, with appropriate plug 54 for the diameter of staff 18 in place, is installed with pins 57 outside flange 13. Pointer hub 21 is slipped off staff 18. Staff 18 enters the hole 56. This insures that the pan 12 is accurately centered relative to the staff 18. The jig 51 is turned so that screws 16 are exposed. A screwdriver is then used to tighten screws 16 and jig 51 is removed. Pan 12 is thus secured on bracket 11 with the flange 13 accurately centered relative to staff 18. Pointer 19 is replaced on staff 18 and then the appropriate cover 26 is selected. Since flange 27 is concentric with flange 13, when the cover 26 is installed as best shown in FIG. 3 the dial 31 is accurately centered relative to the axis of rotation of pointer 19.

What is claimed is:

1. A scale dial-cover combination comprising a transparent circular cover having a flat circular face and cylindrical peripheral first flange, a scale pan having a cylindrical peripheral second flange shaped to engage said first flange, said circular face marked with scale dial markings, said flanges fitting over each other with a slip fit to permit rotation of said cover about the central axis of said pan and to permit said cover to be slipped off said second flange for replacement with a different face, a scale frame bracket, said pan being apertured, attachment means for securing said pan to said bracket, a pointer staff extending through said pan, and a pointer on said staff a short distance behind said face, said pan being formed with enlarged holes and said bracket with tapped holes, screws fitting with play through said enlarged holes and into said tapped holes, to adjust and fix the position of said pan relative to said bracket with said second flange centered relative to said staff.

2. The combination of claim 1 in which said one of said flanges has a plurality of lugs projecting toward the other said flange to restrain unintentional rotation or removal of said cover from said pan.

3. The combination of claim 1 wherein said pointer is removable from said staff and which further comprises a jig having a spider with at least three radial arms having pins equidistant from the center of said spider and tangent to said second flange, said jig formed with a central hole dimensioned to fit accurately over the outer end of said staff, whereby with said screws loose, said pins engaging said second flange and said staff in said central hole said pan is accurately centered relative to said staff, said spider providing access for a screwdriver blade to tighten said screws to said bracket to fix said pan in centered position.

4. The combination of claim 3 in which said jig is formed with a central hole and a central plug formed with a smaller hole to fit over said staff, said plug being interchangeable, whereby different plugs may be interchanged in said jig to accommodate different staff sizes.

5. A combination according to claim 1 in which said cover has an annular rim including said first flange, said rim formed on its rear surface with a rabbet to provide a circular shoulder and a disk fitting in said shoulder, said disk comprising said face.

6. A scale dial-cover combination comprising a transparent circular cover having a flat circular face and cylindrical peripheral first flange, a scale pan having a cylindrical peripheral second flange shaped to engage said first flange, said flanges fitting over each other with a slip fit to permit rotation of said cover about the central axis of said pan and to permit said cover to be slipped off said second flange for replacement with a different face, a pointer rotatable concentric with said flanges, said pan being marked with weight markings and said face with under-over markings having a center line and marks to either side of said center line equally spaced from said center line a distance which is a multiple of one weight marking on said pan, whereby said cover may be turned so that said center line is aligned with a weight marking on said pan, said marks indicating that the weight imposed on said scale is within the under-over limits of said weight marking when said pointer is between said marks.

7. A combination according to claim 6 in which said face is provided with a second set of under-over markings having a second center line and second marks to either side of said second center line equally spaced from said second center line a second distance which is a multiple of said first-mentioned distance.

* * * * *